(12) United States Patent
Nishikawa et al.

(10) Patent No.: US 11,146,126 B2
(45) Date of Patent: Oct. 12, 2021

(54) IRON CORE AND MOTOR USING IRON CORE

(71) Applicant: Panasonic Intellectual Property Management Co., Ltd., Osaka (JP)

(72) Inventors: Yukio Nishikawa, Osaka (JP); Mitsuo Saitoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 16/278,527

(22) Filed: Feb. 18, 2019

(65) Prior Publication Data

US 2019/0181700 A1   Jun. 13, 2019

Related U.S. Application Data

(63) Continuation of application No. PCT/JP2018/030884, filed on Aug. 22, 2018.

(30) Foreign Application Priority Data

Sep. 11, 2017  (JP) .............................. JP2017-173619

(51) Int. Cl.
*H02K 1/16* (2006.01)
*H02K 1/22* (2006.01)
(Continued)

(52) U.S. Cl.
CPC .................. *H02K 1/18* (2013.01); *H01F 3/02* (2013.01); *H01F 3/04* (2013.01); *H01F 3/10* (2013.01);
(Continued)

(58) Field of Classification Search
CPC .. H02K 1/00; H02K 1/02; H02K 1/14; H02K 1/146; H02K 1/148; H02K 1/16;
(Continued)

(56) References Cited

U.S. PATENT DOCUMENTS 4,979,285 A * 12/1990 Martin ...................... H02K 1/26
                                                          29/522.1
5,097,373 A *  3/1992 Yuki ......................... H01F 3/02
                                                         360/125.01
(Continued)

FOREIGN PATENT DOCUMENTS

CN         202772684 U      3/2013
CN         107046335 A      8/2017
(Continued)

OTHER PUBLICATIONS

International Search Report of PCT application No. PCT/JP2018/030884 dated Nov. 13, 2018.
(Continued)

*Primary Examiner* — Tran N Nguyen
(74) *Attorney, Agent, or Firm* — McDermott Will and Emery LLP (57) ABSTRACT

An iron core including a laminate of a plurality of fixed electromagnetic steel sheets, a laminate of alloy thin strips which is sandwiched between the laminate of the electromagnetic steel sheets, a fastening mechanism which penetrates the laminates of electromagnetic steel sheets and alloy thin strips, and a fixing base. The laminate of alloy thin strips reduces compressive and torsional forces acting on the laminate of alloy thin strips by using the iron core having a structure in which upper and lower portions of a laminate of alloy thin strips having nanocrystal grains are sandwiched together with laminates of amorphous alloy thin strips. Furthermore, a motor including a rotor and the above-described iron core is used.

9 Claims, 9 Drawing Sheets

(51) Int. Cl.
*H02K 1/18* (2006.01)
*H02K 1/02* (2006.01)
*H01F 3/02* (2006.01)
*H01F 27/26* (2006.01)
*H02K 15/02* (2006.01)
*H01F 27/245* (2006.01)
*H01F 3/04* (2006.01)
*H01F 3/10* (2006.01)
*H01F 27/25* (2006.01)
*H02K 1/14* (2006.01)
*H02K 1/27* (2006.01)

(52) U.S. Cl.
CPC ........ *H01F 27/245* (2013.01); *H01F 27/25* (2013.01); *H01F 27/26* (2013.01); *H01F 27/263* (2013.01); *H02K 1/02* (2013.01); *H02K 1/148* (2013.01); *H02K 1/185* (2013.01); *H02K 15/02* (2013.01); *H02K 15/022* (2013.01); *H01F 2003/106* (2013.01); *H02K 1/2733* (2013.01); *H02K 2201/09* (2013.01)

(58) Field of Classification Search
CPC H02K 1/18; H02K 1/185; H02K 1/22; H02K 15/00; H02K 15/02; H02K 15/022; H01F 27/00; H01F 27/24; H01F 27/245; H01F 27/25; H01F 27/26; H01F 27/263; H01F 3/00; H01F 3/02; H01F 3/04; H01F 3/10
See application file for complete search history.

(56) References Cited

U.S. PATENT DOCUMENTS

| | | | |
|---|---|---|---|
| 5,142,178 A * | 8/1992 | Kloster | H02K 1/16 310/216.048 |
| 5,990,584 A * | 11/1999 | Luo | H02K 1/146 310/156.26 |
| 6,222,296 B1 | 4/2001 | Sakai et al. | |
| 9,496,772 B2 | 11/2016 | Myojin | |
| 2006/0066169 A1 * | 3/2006 | Daugherty | H02K 1/02 310/216.016 |
| 2013/0214198 A1 * | 8/2013 | Igarashi | H01F 1/15366 252/62.56 |
| 2014/0111884 A1 * | 4/2014 | Showa | H02K 21/22 360/99.08 |
| 2017/0229930 A1 * | 8/2017 | Makino | H02K 1/02 |

FOREIGN PATENT DOCUMENTS

| | | | |
|---|---|---|---|
| EP | 1643613 | A2 | 4/2006 |
| JP | 52-137610 | | 11/1977 |
| JP | 5-088162 | U | 11/1993 |
| JP | 10-304608 | | 11/1998 |
| JP | 2000-060052 | | 2/2000 |
| JP | 2011-066987 | | 3/2011 |
| JP | 2013-150451 | | 8/2013 |
| JP | 2014-155347 | | 8/2014 |
| JP | 2014155347 | * | 8/2014 |
| JP | 2016197646 | * | 11/2016 |
| JP | 2017-143251 | | 8/2017 |

OTHER PUBLICATIONS

English Translation of Chinese Search Report dated May 12, 2020 for the related Chinese Patent Application No. 201880003272.3.
The Extended European Search Report dated Oct. 29, 2020 for the related European Patent Application No. 18842695.1.

* cited by examiner

IRON CORE AND MOTOR USING IRON CORE

TECHNICAL FIELD

The technical field relates to an iron core and a motor using the iron core. The technical field particularly relates to an iron core in which alloy thin strips are laminated and a motor using the iron core as a stator.

BACKGROUND

As a laminate of magnetic plates in an iron core (stator) for a motor in the related art, pure iron or an electromagnetic steel sheet is used. In motors aimed for higher efficiency, amorphous thin strips or thin strips having nanocrystal grains are used in some iron cores (for example, see Japanese Patent Unexamined Publication No. 2014-155347).

Figure 10:
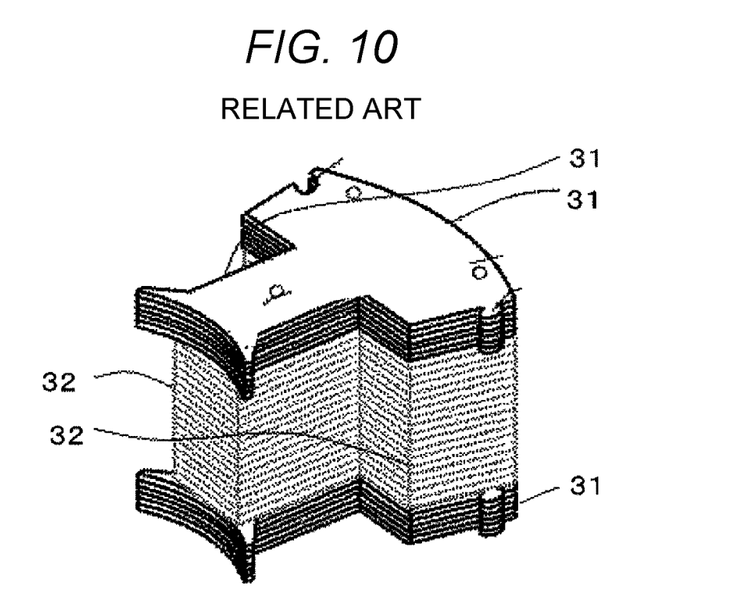
FIG. 10 is a perspective view of split cores in the related art disclosed in Japanese Patent Unexamined Publication No. 2014-155347.

FIG. 10 is a perspective view of a split core disclosed in Japanese Patent Unexamined Publication No. 2014-155347. Laminate 31 obtained by laminating electromagnetic steel sheets and caulking and laminate 32 in which a plurality of amorphous thin strips are laminated and bonded with an adhesive are laminated and fixed by an adhesive.

SUMMARY

However, in the configuration of FIG. 10, since an adhesive enters between the layers of the amorphous thin strips, there is a problem that the space factor is deteriorated and thereby the motor efficiency is deteriorated.

Figure 11A:
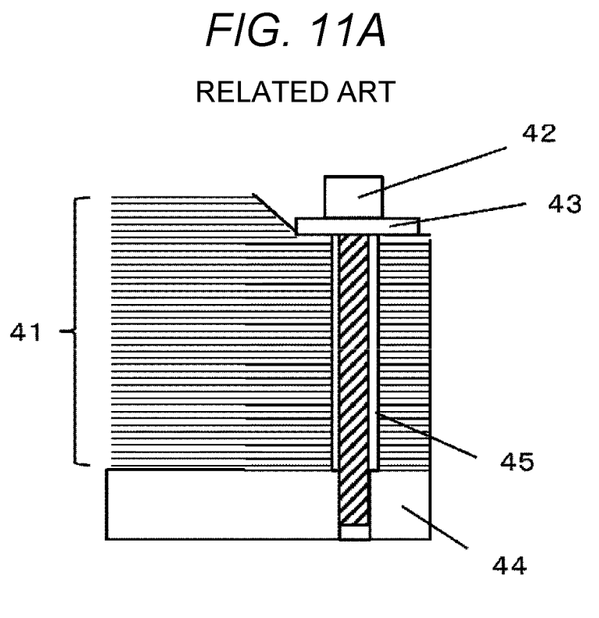
FIG. 11A is a cross-sectional view of a fastener of a laminate of alloy thin strips in the related art.
Figure 11B:
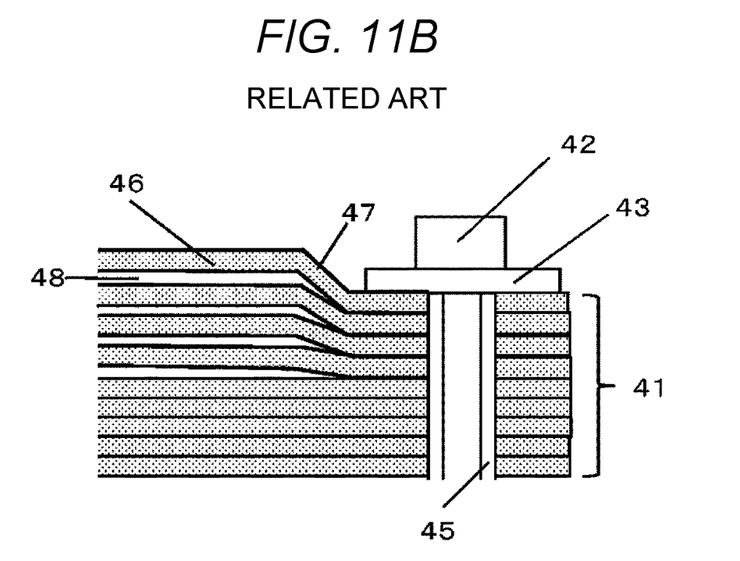
FIG. 11B is a partially enlarged cross-sectional view of the fastener of the laminate of the alloy thin strips in the related art.
Figure 11C:
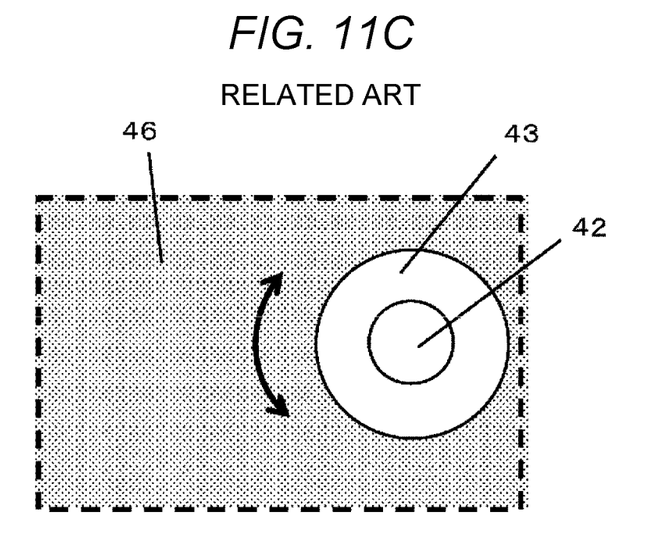
FIG. 11C is a top view of the fastener of the laminate of the alloy thin strips in the related art.

The problem of fastening only the laminate of the alloy thin strips with a bolt will be described in more detail. FIGS. 11A to 11C show a fastening portion (bolt 42 and washer 43) of the laminate of the alloy thin strips. FIG. 11A is a cross-sectional view of fasteners, FIG. 11B is a cross-sectional enlarged view of the vicinity of the fastener, and FIG. 11C is an enlarged view top view of the vicinity of the fastener.

In FIG. 11A, laminate 41 of the alloy thin strips is fastened by bolt 42 which passes through through-hole 45 and reaches metal board 44. This state will be described in detail with reference to FIG. 11B of the cross-sectional enlarged view. Alloy thin strips 46 fastened by bolt 42 adhere tightly in a lamination direction without gaps. However, at a place where there is no constraint of washer 43, since alloy thin strip 46 has low rigidity, it tends to spread and forms gap 48. At this time, in the vicinity of the periphery of washer 43, deformation 47 is generated in alloy thin strip 46, and the deformation is larger at an end (upper surface) in the lamination direction of laminate 41 of alloy thin strips 46.

In FIG. 11C which is an enlarged view top view, torsion is generated in an arrow direction of alloy thin strip 46 by the rotation force of washer 43 at the time of fastening. When the sum of compressive deformation in the lamination direction and the torsional deformation in the plane exceeds the limit of fracture of alloy thin strip 46, damage such as breakage occurs in alloy thin strip 46. When it is damaged, a magnetic path at the time of driving becomes discontinuous unlike the design, and the magnetic characteristics deteriorate. Even when it is not damaged, the magnetic characteristics are deteriorated by the stress generated by the deformation.

An object of the disclosure is to solve the problems in the related art, and to provide an iron core and a motor which do not damage magnetic materials at the time of fastening and fixing and do not deteriorate the magnetic characteristics.

In order to achieve the above-described object, an iron core of the disclosure includes a laminate of a plurality of fixed electromagnetic steel sheets, a laminate of alloy thin strips which is sandwiched between the laminate of the electromagnetic steel sheets, a fastening mechanism which penetrates the laminates of electromagnetic steel sheets and alloy thin strips, and a fixing base. The laminates of electromagnetic steel sheets and alloy thin strips are fastened to the fixing base by the fastening mechanism. Furthermore, a motor including a rotor and the above-described iron core is used.

With this configuration, it is possible to provide an iron core and a motor that do not damage a magnetic material at the time of fastening and fixing and do not deteriorate the magnetic characteristics.

According to the iron core and the motor of the disclosure, damage and deterioration of magnetic characteristics can be prevented at the time of fastening the assembly.

DESCRIPTION OF EMBODIMENTS

Hereinafter, embodiments of the disclosure will be described with reference to the drawings.

Embodiment 1

Figure 1A:
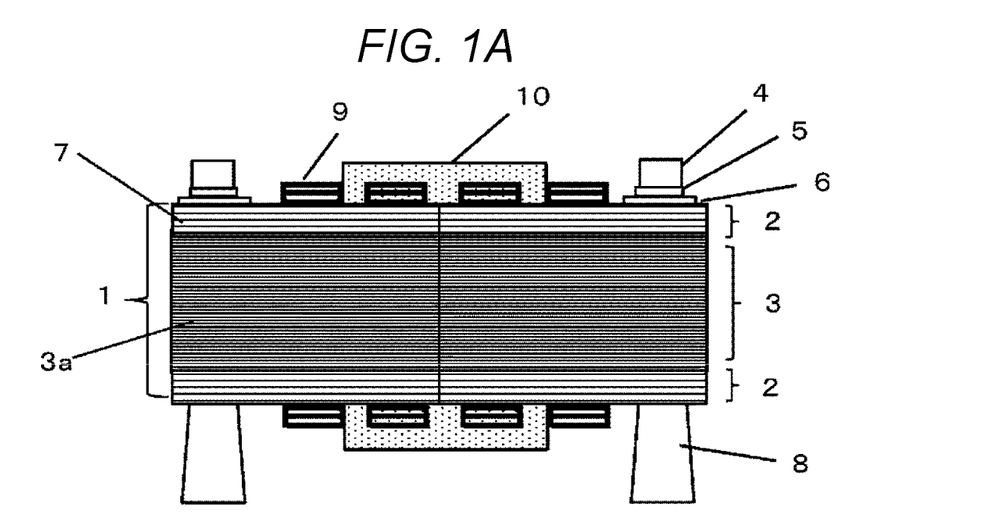
FIG. 1A is a side view of a motor using an iron core of Embodiment 1.
Figure 1B:
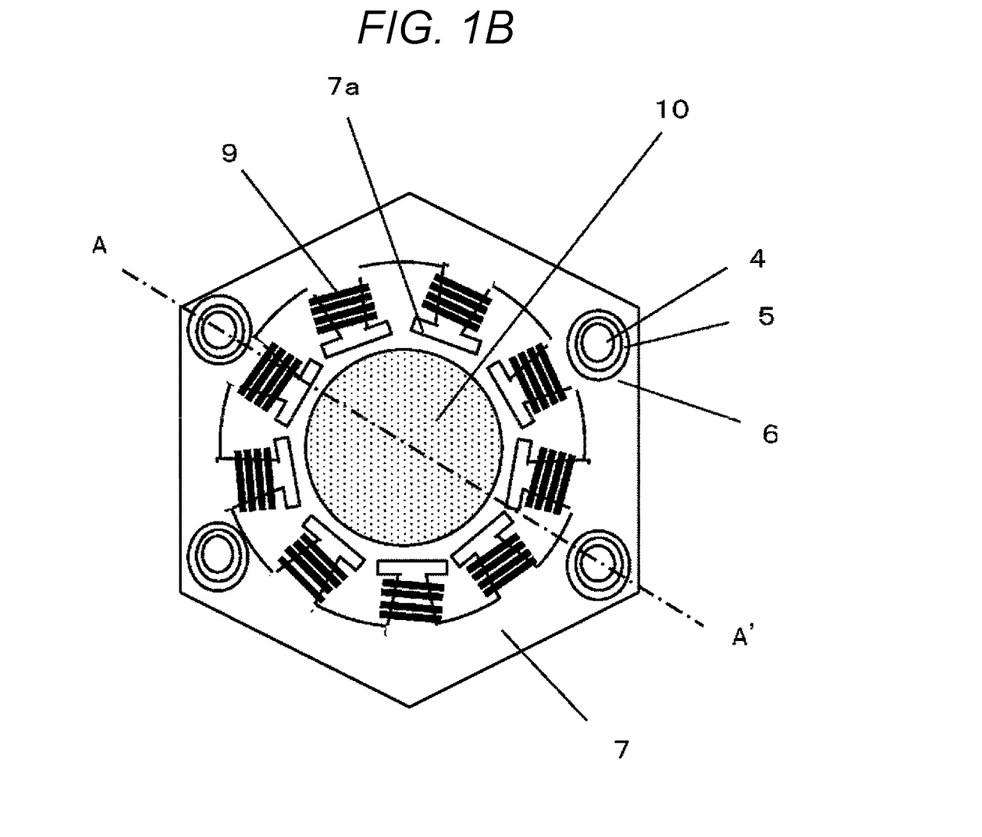
FIG. 1B is a top view of the motor using the iron core of Embodiment 1.

FIG. 1A is a side view of a motor using an iron core according to Embodiment 1 of the disclosure. FIG. 1B is a top view of FIG. 1A.

In the motor of Embodiment 1, since the rigidity and strength of a single electromagnetic steel sheet 7 is insufficient, a laminated portion 1 in which upper and lower portions of laminate 3 of alloy thin strips 3a are sandwiched with laminates 2 of electromagnetic steel sheets 7 is formed. Alloy thin strip 3a is an iron alloy thin strip 3a, and may be any one of an amorphous thin strip not subjected to heat treatment, an amorphous thin strip subjected to heat treatment, or a thin strip having nanocrystal grains obtained by heat treatment of the amorphous thin strip. When the amorphous thin strip is subjected to heat treatment to generate nanocrystal grains, it is excellent in soft magnetic characteristics required for a stator. On the other hand, the amorphous thin strip subjected to heat treatment has a drawback that it has low toughness and can be easily broken merely by being subjected to heat. Here, examples of alloy thin strip 3a having nanocrystal grains will be described.

Winding 9 is wound on projections called teeth 7a of electromagnetic steel sheet 7 to be a stator. The stator is fastened in a lamination direction by bolt 4 via spring washer 5 and washer 6 and fixed to fixing base 8. When rotor 10 is inserted into an opening at the center of laminated portion 1 and a predetermined electricity is applied to winding 9, rotor 10 rotates and operates as a motor.

Figure 2:
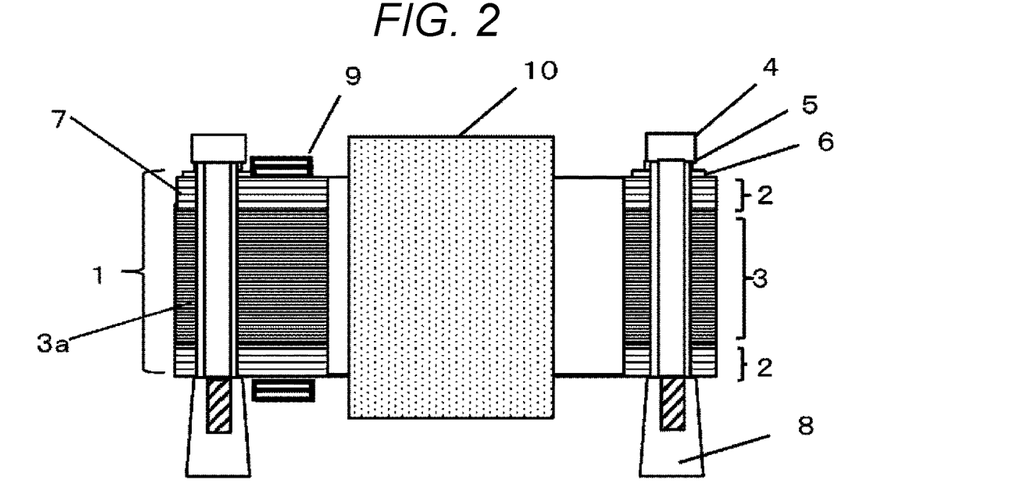
FIG. 2 is a cross-sectional view taken along line A-A' of FIG. 1B.

FIG. 2 is a cross-sectional view taken along line A-A' of FIG. 1B. The upper and lower portions of laminate 3 of alloy thin strips 3a are sandwiched together with laminates 2 of electromagnetic steel sheets 7 composed of five electromagnetic steel sheets 7, and fastened and fixed to fixing base 8 by bolt 4.

Figure 3A:
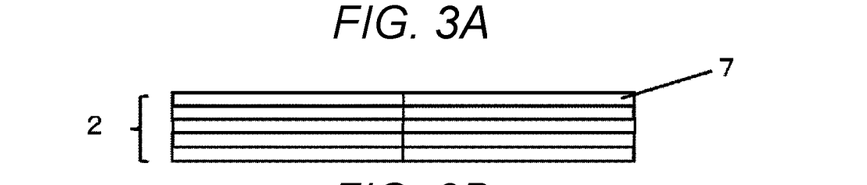
FIG. 3A is a side view of a laminate of electromagnetic steel sheets of Embodiment 1.
Figure 3B:
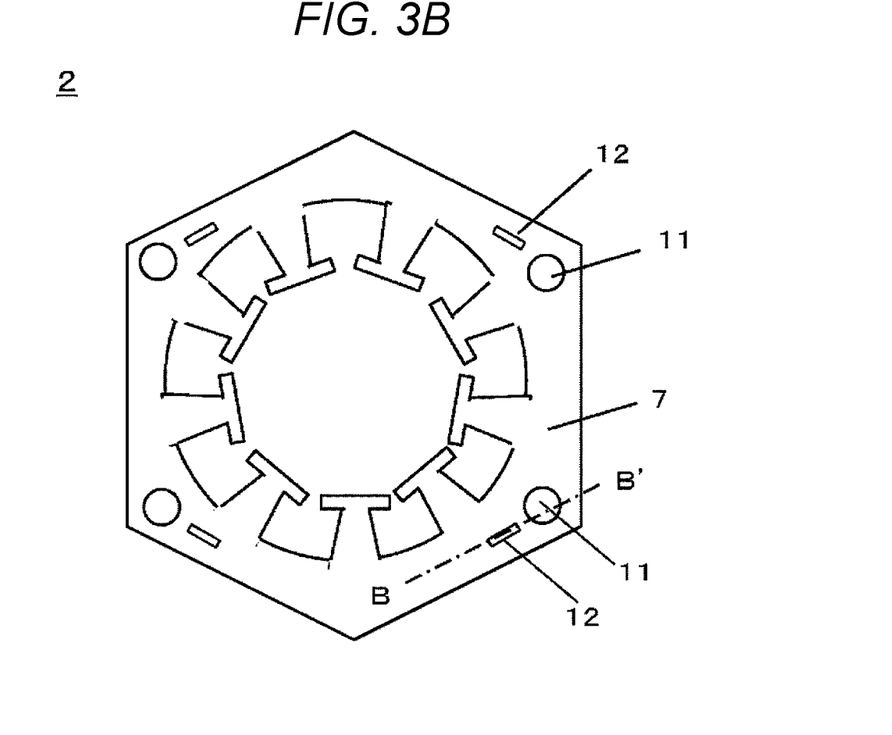
FIG. 3B is a top view of the laminate of the electromagnetic steel sheets of Embodiment 1 of FIG. 3A.

FIG. 3A is a side view of laminate 2 of electromagnetic steel sheets 7. FIG. 3B is a top view of FIG. 3A. Laminate 2 of electromagnetic steel sheets 7 is fastened and integrated by four caulkings 12. When inserting bolt 4 through through-hole 11 to fasten, compressive and torsional stresses are generated in laminate 2 of electromagnetic steel sheets 7. Compared with a case without caulking, the rigidity of laminate 2 of electromagnetic steel sheets 7 is increased due to the contribution of caulking 12, and the compressive deformation is reduced in laminate 2 of electromagnetic steel sheets 7. Also, torsion due to rotation scarcely occurs. As a result, a force caused by compression or torsion is not transmitted to laminate 3 of alloy thin strips 3a between laminates 2 of electromagnetic steel sheets 7, and damage of the thin strip does not occur. As the number of electromagnetic steel sheets 7 is larger or the area of the caulking is larger, the effect of prevention of damage increases, but motor efficiency decreases.

Figure 4:
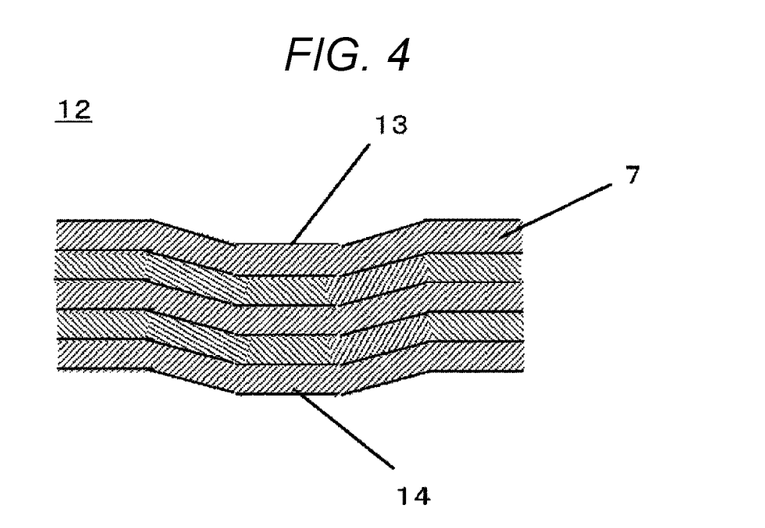
FIG. 4 is a cross-sectional view of the laminate of the electromagnetic steel sheets of Embodiment 1 taken along line B-B' of FIG. 3B after caulking.

FIG. 4 is a cross-sectional view of caulking 12 taken along line B-B' of FIG. 3B. Depression 13 and projection 14 are generated by caulking five electromagnetic steel sheets 7. If projection 14 is brought into contact with laminate 3 of alloy thin strips 3a as it is and bolt 4 is fastened, projection 14 is pressed against the thin strip, and damages laminate 3 of alloy thin strips 3a, so that projection 14 is removed by an additional process.

Figure 5:
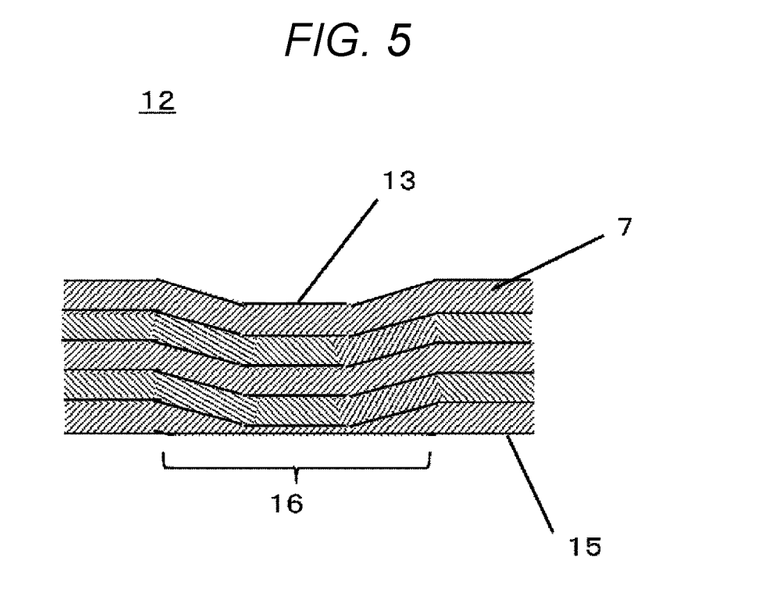
FIG. 5 is a cross-sectional view of a plane after removing a projection on the laminate of the electromagnetic steel sheets of Embodiment 1.

FIG. 5 is a cross-sectional view after projection 14 of FIG. 4 is removed by cutting and plane 15 is exposed. Plane 15 formed by cutting has cutting trace 16. The surface roughness does not damage the thin strip when the unevenness is several nanometers or less (10 μm or less). Since the surface of electromagnetic steel sheet 7 other than cutting trace 16 is in a rolled state, the surface roughness is smaller than cutting trace 16 in many cases, and the color is often different. The maximum is about 1 μm or less.

The plate thickness of electromagnetic steel sheet 7 in plane becomes thin, but there is no problem for integration of electromagnetic steel sheet 7 when it is connected.

Although a normal bolt is used as bolt 4, when the structure is provided with a stepped bolt or a cylindrical pipe on an outer periphery of the bolt, the compressive deformation does not progress beyond a predetermined dimension. As a result, the occurring stress accompanied by the fastening is suppressed, and the effect of prevention of damage the thin strip is further increased.

With the above-described configuration, it is possible to provide the iron core and the motor that do not damage a magnetic material (alloy thin strip 3a) at the time of fastening and fixing and do not deteriorate the magnetic characteristics.

Embodiment 2

Figure 6A:
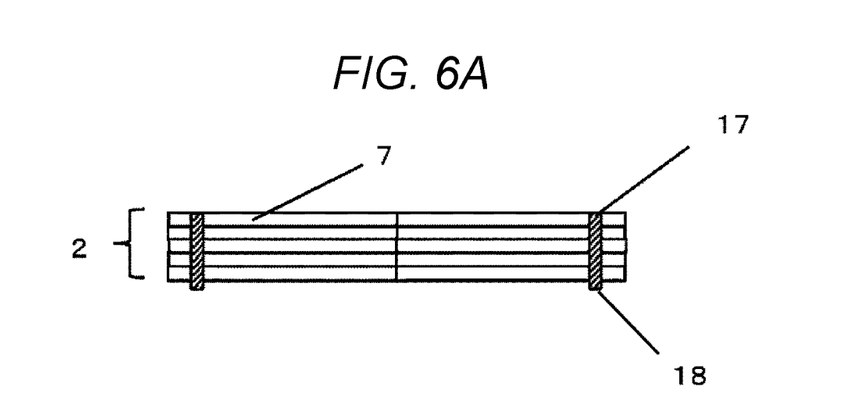
FIG. 6A is a side view of a laminate of electromagnetic steel sheets of Embodiment 2.
Figure 6B:
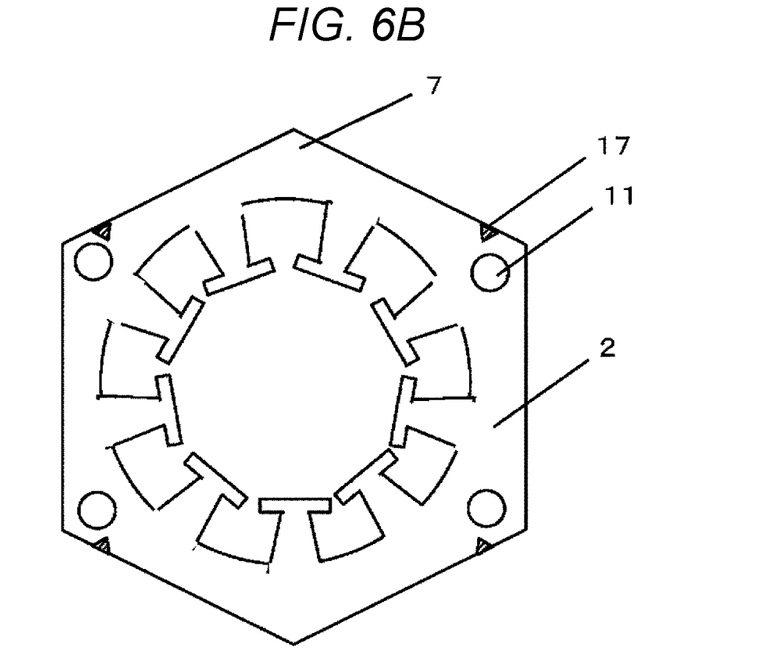
FIG. 6B is a top view of the laminate of the electromagnetic steel sheets according to Embodiment 2.

FIG. 6A is a side view of laminate 2 of electromagnetic steel sheets 7 according to the iron core of Embodiment 2 of the disclosure. FIG. 6B is a top view of FIG. 6A. FIGS. 6A and 6B are different from Embodiment 1 in that laminate 2 is integrated by welding the end surface of laminate 2. Items not described are the same as those in Embodiment 1.

When the welding of the end surface of laminate 2 is carried out in a large area, the interlayer insulation characteristics of electromagnetic steel sheet 7 are deteriorated and the motor efficiency is reduced due to the generation of the eddy current. The end surface of laminate 2 in a vicinity of through-hole 11 is wire-welded with a laser as a position that does not interfere a magnetic path, so that the area required for securing the strength is minimized. Weld 17 exists in laminate 2 of electromagnetic steel sheets 7 after welding. In weld 17, projection 18 in which the molten metal is solidified tends to remain on the starting side, particularly on the ending side. That is, projection 18 easily remains on the upper and lower surfaces of laminate 2. As in Embodiment 1, projection 18 is also removed by cutting.

Figure 7A:
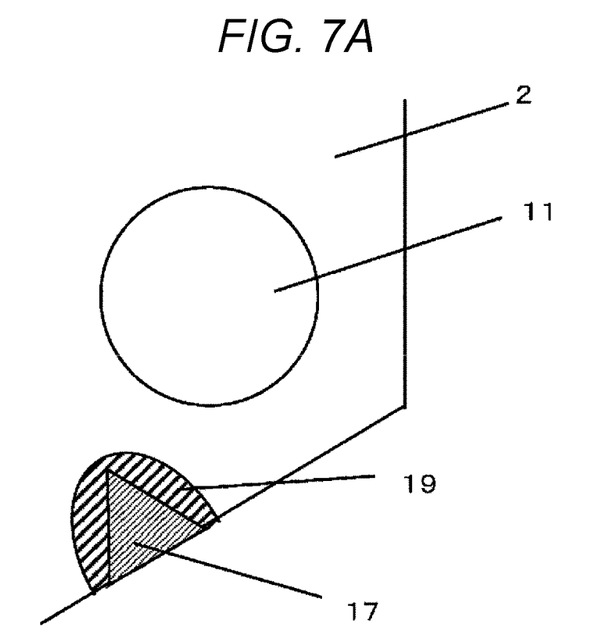
FIG. 7A is a surface view of a vicinity of a weld after removing the projection of the laminate of the electromagnetic steel sheets according to Embodiment 2.
Figure 7B:
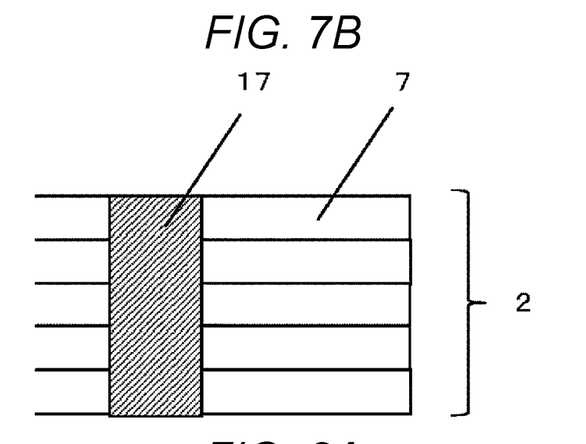
FIG. 7B is a side view of the vicinity of the weld of the laminate of the electromagnetic steel sheets according to Embodiment 2.

FIG. 7A is a surface view of a vicinity of weld 17 of laminate 2 of electromagnetic steel sheets 7 after removing projection 18 of FIG. 6A. FIG. 7B is a side view of FIG. 7A. In FIG. 7A, since the surface of weld 17 is cut, weld 17 melted from the surface in a wedge shape leaves a boundary with the non-melted portion, and cutting trace 19 is formed on the surface.

In the periphery of weld 17, cutting trace 19 formed by being cut over to the non-melted portion remains in an irregular shape. Since cutting trace 19 remains only on the uppermost surface of laminate 2 of electromagnetic steel sheets 7, only weld 17 having no cutting trace 19 is observed in the side view of FIG. 7B. The damage of alloy thin strip 3a can be prevented by removing projection 18.

The surface unevenness of cutting trace 19 is several nanometers or less, specifically 10 µm or less.

Embodiment 3: Adhesive 20

Figure 8A:
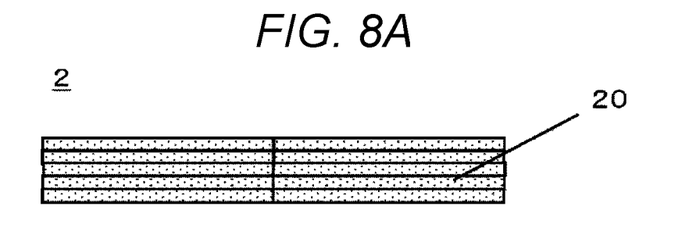
FIG. 8A is a side view of a laminate of electromagnetic steel sheets of Embodiment 3.
Figure 8B:
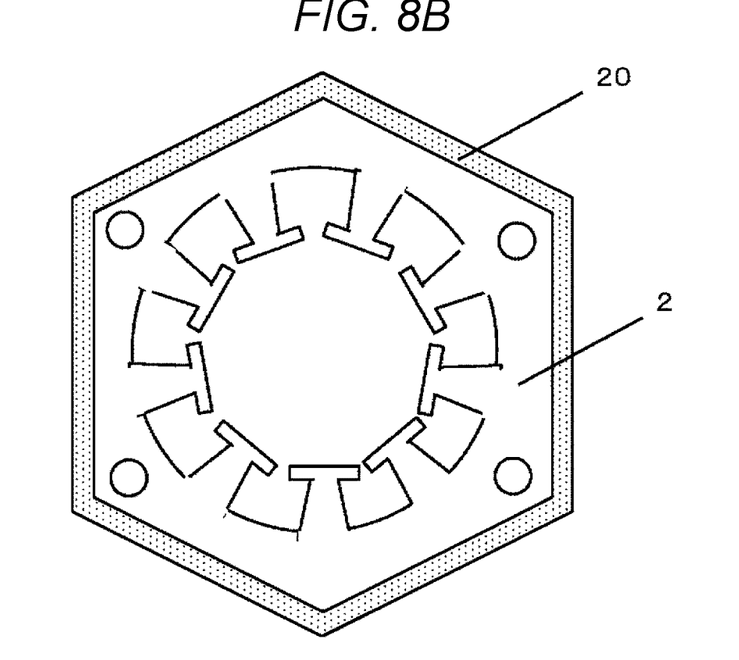
FIG. 8B is a top view of the laminate of the electromagnetic steel sheets of Embodiment 3.

FIG. 8A is a side view of laminate 2 of electromagnetic steel sheets 7 according to the iron core of Embodiment 3 of the disclosure. FIG. 8B is a top view of FIG. 8A. Items not described are the same as in the above-described embodiments.

FIGS. 8A and 8B are different from Embodiments 1 and 2 in that adhesive 20 is provided and fixed on the entire surface of the laminated end surface. When adhesive 20 does not stick out upward and downward from the laminated end surface, no projection is generated on the plane side. However, in a case where the projection is generated, it is removed as in Embodiment 1 or Embodiment 2. Since adhesive 20 has no conduction, the interlayer insulation characteristics of electromagnetic steel sheet 7 are maintained without negatively affecting the motor efficiency. The entire laminated end surface can be bonded, so that strong fixation can be made.

As long as necessary adhesive strength cannot be secured, it is not absolutely necessary to provide adhesive 20 on the entire laminated end surface.

Embodiment 4

Figure 9A:
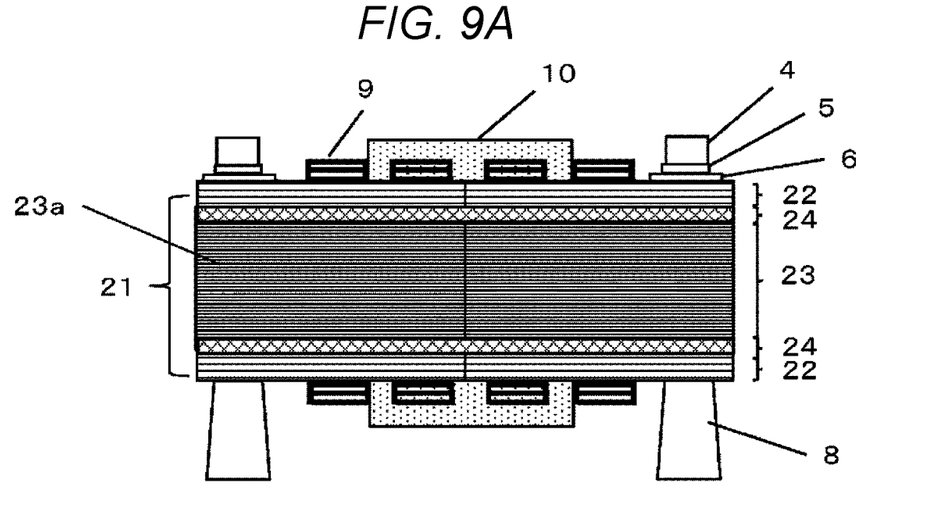
FIG. 9A is a side view of a motor using an iron core of Embodiment 4.
Figure 9B:
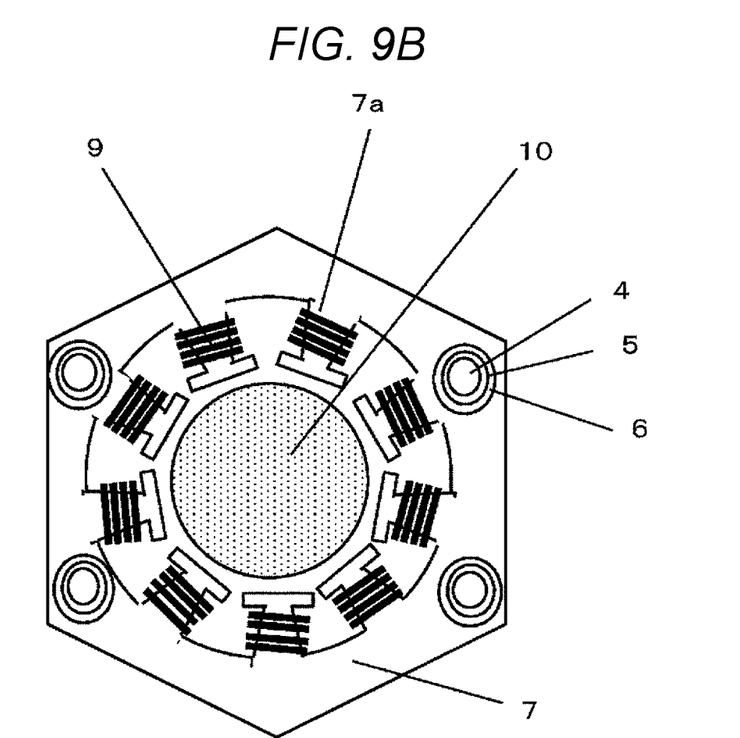
FIG. 9B is a top view of the motor using the iron core of Embodiment 4.

FIG. 9A is a side view of a motor using an iron core according to Embodiment 4 of the disclosure. FIG. 9B is a top view of FIG. 9A. Items not described are the same as in the above-described embodiments.

FIGS. 9A and 9B are different from Embodiment 1 in that laminate 24 of amorphous thin strips not subjected to heat treatment is provided between laminate 22 of electromagnetic steel sheets 7 and laminate 23 of alloy thin strips 23a having nanocrystal grains by the heat treatment.

When the number of electromagnetic steel sheets 7 of laminate 22 is increased in order to weaken the force acting on laminate 23 of alloy thin strips 23a, there is a harmful effect that the motor efficiency is deteriorated. The amorphous thin strip not subjected to heat treatment is inferior to a thin strip having nanocrystals in soft magnetic characteristics, but is superior to electromagnetic steel sheet 7. The toughness of the amorphous thin strip not subjected to heat treatment against external force is superior to the thin strip having nanocrystal grains subjected to heat treatment.

Therefore, by reducing the number of electromagnetic steel sheets 7 and replacing the thickness with the amorphous thin strip not subjected to heat treatment, it is possible to prevent the damage of laminate 23 of alloy thin strips 23a having nanocrystal grains and suppress deterioration in the motor efficiency without changing the thickness of laminated portion 21.

Here, the number of electromagnetic steel sheets 7 of laminate 22 is reduced from five in Embodiment 1 to four to obtain laminate 22. Since the plate thickness of the amorphous thin strip not subjected to heat treatment is about one-tenth of electromagnetic steel sheet 7, ten amorphous thin strips not subjected to heat treatment corresponding to the thickness of reduced electromagnetic steel sheet 7 are laminated to form laminate 24 of amorphous thin strips. The thickness of laminate 23 of alloy thin strips 23a having nanocrystal grains is not changed.

As a result, it was possible to increase the motor efficiency equal to or higher than that of the related art without damaging laminate 23 of alloy thin strips 23a having nanocrystal grains.

The thin strip subjected to heat treatment may be an amorphous thin strip.

The above-described embodiments can be combined.

According to the iron core of the disclosure, the rigidity of the iron core can be secured and the shape can be stabilized at the time of fastening and fixing. The iron core according to the disclosure is useful as a stator of a motor. Furthermore, the iron core according to the disclosure can also be applied to applications of electronic components such as transformers, other than motors.

REFERENCE SIGNS LIST

1 LAMINATED PORTION
2 LAMINATE
3 LAMINATE
3a ALLOY THIN STRIP
4 BOLT
5 SPRING WASHER
6 WASHER
7 ELECTROMAGNETIC STEEL SHEET
7a TEETH
8 FIXING BASE
9 WINDING
10 ROTOR
11 THROUGH-HOLE
12 CAULKING
13 DEPRESSION
14 PROJECTION
15 PLANE
16 CUTTING TRACE
17 WELD
18 PROJECTION
19 CUTTING TRACE
20 ADHESIVE
21 LAMINATED PORTION
22 LAMINATE
23 LAMINATE
23a ALLOY THIN STRIP
24 LAMINATE OF AMORPHOUS THIN STRIP
31 LAMINATE
32 LAMINATE
41 LAMINATE OF ALLOY THIN STRIP
42 BOLT
43 WASHER
44 METAL BOARD
45 THROUGH-HOLE
46 ALLOY THIN STRIP
47 DEFORMATION
48 GAP

What is claimed is:

1. An iron core comprising:
  laminates of a plurality of electromagnetic steel sheets;
  a laminate of alloy strips which is sandwiched between the laminates of the plurality of electromagnetic steel sheets;
  a fastening mechanism that penetrates the laminates of the plurality of electromagnetic steel sheets and alloy strips; and
  a fixing base, wherein
    the laminates of the plurality of electromagnetic steel sheets and the laminate of the alloy strips are fastened to the fixing base by the fastening mechanism,
    the laminates include a caulking part adjacent the fastening mechanism,
    a first surface of the laminates including the caulking part is recessed, a second surface of the laminates opposite the first surface and including the caulking part is flat, and a surface roughness of the second surface including the flat is higher than a surface roughness of other portions of the second surface.

2. The iron core of claim 1, wherein the laminates of the plurality of electromagnetic steel sheets has a weld on an end surface and a cutting trace in the weld and a vicinity of the weld on a surface of the laminates of the plurality of electromagnetic steel sheets.

3. The iron core of claim 1, wherein the laminates of the plurality of electromagnetic steel sheets has an adhesive on an end surface of the laminates of the plurality of electromagnetic steel sheets.

4. The iron core of claim 1, wherein each of the alloy strips has nanocrystal grains.

5. The iron core of claim 1, wherein each of the alloy strips is amorphous.

6. An iron core, comprising:

laminates of a plurality of electromagnetic steel sheets;

a laminate of alloy strips including nanocrystal which is sandwiched between the laminates of the plurality of electromagnetic steel sheets;

a fastening mechanism that penetrates the laminates of the plurality of electromagnetic steel sheets and alloy strips; and a fixing base, wherein upper and lower portions of the laminate of the alloy strips are sandwiched between a laminate of amorphous alloy strips, the laminate of the amorphous alloy strips has a same thickness and composition as the laminate of alloy strips, and the amorphous alloy strips has inferior magnetic properties than the alloy strips.

7. A motor comprising:

a rotor; and the iron core of claim 1.

8. The iron core of claim 1, wherein the surface roughness of the second surface including the flat is 10 μm or less, and the surface roughness of other portions of the second surface is 1 μm or less.

9. The iron core of claim 1, wherein the electromagnetic steel sheet for the first surface has the same thickness as other electromagnetic steel sheets, and the electromagnetic steel plate of the second surface is thinner than the other electromagnetic steel plates.

* * * * *